(12) United States Patent
Howard et al.

(10) Patent No.: US 12,702,138 B2
(45) Date of Patent: Aug. 11, 2026

(54) METHOD OF SORTING BEEF CARCASSES

(71) Applicant: Cargill, Incorporated, Wayzata, MN (US)

(72) Inventors: Scott T. Howard, Wichita, KS (US); Chancie B. Rose, Rose Hill, KS (US)

(73) Assignee: Cargill, Incorporated, Wayzata, MN (US)

( * ) Notice: Subject to any disclaimer, the term of this patent is extended or adjusted under 35 U.S.C. 154(b) by 27 days.

(21) Appl. No.: 18/251,985

(22) PCT Filed: Nov. 9, 2021

(86) PCT No.: PCT/US2021/058631
§ 371 (c)(1),
(2) Date: May 5, 2023

(87) PCT Pub. No.: WO2022/099198
PCT Pub. Date: May 12, 2022

(65) Prior Publication Data

US 2024/0008498 A1 Jan. 11, 2024

Related U.S. Application Data

(60) Provisional application No. 63/111,260, filed on Nov. 9, 2020.

(51) Int. Cl.
*A22B 5/00* (2006.01)

(52) U.S. Cl.
CPC ............ *A22B 5/007* (2013.01); *A22B 5/0064* (2013.01); *A22B 5/0076* (2013.01)

(58) Field of Classification Search
CPC ...... A22B 5/0064; A22B 5/007; A22B 5/0076
(Continued)

(56) References Cited

U.S. PATENT DOCUMENTS 5,194,036 A 3/1993 Chevalier
5,470,274 A 11/1995 Kadi
(Continued)

FOREIGN PATENT DOCUMENTS

CA 1328312 C 4/1994
CA 2642046 C 4/2003
(Continued)

OTHER PUBLICATIONS

"2015 Annual LPGMN Statistics Summary, Livestock, Meat, Poultry, Grain & Slaughter Data" USDA Agriculture Marketing Service, 2015, 138 pages, retrieved from the Internet: <URL: https://www.ams.usda.gov/sites/default/files/media/AMTR2015.pdf>.
(Continued)

*Primary Examiner* — David J Parsley

(57) ABSTRACT

A method of sorting beef carcasses comprises determining the hot carcass weight and the Torso Section Thickness of a plurality of beef carcasses at a Standardized Location on the carcass torso; determining the ratio of hot carcass weight to Torso Section Thickness of individual carcasses of the plurality of beef carcasses and, prior to processing of the carcasses into smaller portions, sorting the carcasses into a groups based on the ratio of hot carcass weight to Torso Section Thickness. In another aspect, the sorting is carried out based on the lean point of the Torso Section of individual carcasses at a Standardized Location on the carcass torso of the plurality of beef carcasses.

18 Claims, 1 Drawing Sheet

(58) Field of Classification Search
USPC ........................................ 452/134, 157, 198
See application file for complete search history.

(56) References Cited

U.S. PATENT DOCUMENTS

| | | | | |
|---|---|---|---|---|
| 5,668,634 | A * | 9/1997 | Newman ............... | G01N 33/12 452/157 |
| 5,937,080 | A * | 8/1999 | Vogeley, Jr. ............ | B26D 7/30 382/110 |
| 6,877,460 | B1 | 4/2005 | Ellis | |
| 6,891,961 | B2 | 5/2005 | Eger | |
| 7,214,128 | B2 | 5/2007 | Kriesel | |
| 7,766,730 | B2 * | 8/2010 | Vote ...................... | A22B 7/007 452/184 |
| 8,002,613 | B2 | 8/2011 | Allen | |
| 8,472,675 | B2 | 6/2013 | Wilson | |
| 8,474,405 | B1 | 7/2013 | Pratt | |
| 8,494,226 | B2 | 7/2013 | Wilson | |
| 9,386,781 | B2 | 7/2016 | Mckenna | |
| 2005/0211174 | A1 | 9/2005 | Ellis | |
| 2007/0260347 | A1 * | 11/2007 | Mirtsching ........... | A22B 5/007 452/155 |
| 2015/0146937 | A1 | 5/2015 | Negretti | |

FOREIGN PATENT DOCUMENTS

| | | | |
|---|---|---|---|
| CN | 102156129 | B | 8/2011 |
| DE | 4408604 | C2 | 5/1996 |
| EP | 0046704 | B1 | 3/1982 |
| EP | 0499550 | B1 | 8/1992 |
| EP | 0649282 | B1 | 4/1995 |
| EP | 0920620 | B1 | 6/1999 |
| EP | 1026516 | B1 | 8/2000 |
| EP | 1060391 | B1 | 12/2000 |
| EP | 1694129 | B1 | 8/2006 |
| EP | 1887874 | B1 | 2/2008 |
| FR | 2462205 | A1 | 2/1981 |
| FR | 2643459 | A1 | 8/1990 |
| GB | 2356792 | * | 6/2001 |
| WO | 200049400 | A1 | 8/2000 |
| WO | 2001004607 | W | 1/2001 |
| WO | 2001092855 | A1 | 12/2001 |
| WO | 2006086450 | A1 | 8/2006 |
| WO | 2016023075 | A1 | 2/2016 |

OTHER PUBLICATIONS

Bass et al., "Prediction of beef carcass composition by tissue depth measurements taken over the 11th rib." Livestock Production Science. May 1, 1982;9(3):337-348.

Berg et al. "New concepts of cattle growth." Sydney University Press, University of Sydney; 1976, Chapter 5, pp. 130-137 and Chapter 8, pp. 201-226.

Berg et al., "Growth patterns of bovine muscle, fat and bone." Journal of animal science. May 1, 1968;27(3):611-619.

Boggs et al., "Livestock and carcasses: an integrated approach to evaluation, grading, and selection." Dubuque (IA): Kendall/Hunt publishing company, p. 7, 1998.

Conroy et al., Predicting beef carcass meat, fat and bone proportions from carcass conformation and fat scores or hindquarter dissection. Animal. Feb. 2010;4(2):234-241.

Department of Agriculture, Agricultural Marketing Service, United States Standards for Grades of Carcass Beef, Notice, request for comments, Federal Register, vol. 79, No. 158, Friday, Aug. 15, 2014, 2 pages.

Department of Agriculture, Agricultural Marketing Service, United States Standards for Grades of Carcass Beef, Notice, request for comments, Federal Register, vol. 81, No. 164, Aug. 24, 2016, 3 pages.

Holló et al., "Application of X-ray computer tomography (CT) in cattle production." Asian-Australasian Journal of Animal Sciences. 2007;20(12):1901-1908.

Howard, "Beef tenderness and the management of calf-fed Holstein steers to meet market standards" Doctoral dissertation, Colorado State University, 154 pages, Summer 2013.

Johnson et al., "An evaluation of different sites for measuring fat thickness in the beef carcass to determine carcass fatness." Australian Journal of Agricultural Research. 1981;32(6):999-1007.

Jones et al., "The prediction of beef carcass lean content by an electronic probe, a visual scoring system and carcass measurements." Canadian Journal of Animal Science. Sep. 1, 1989;69(3):641-648.

Lawrence et al., "Predicting red meat yields in carcasses from beef-type and calf-fed Holstein steers using the United States Department of Agriculture calculated yield grade." Journal of animal science. Jun. 1, 2010;88(6):2139-2143.

Lawrence et al., "Technical note: The United States Department of Agriculture beef yield grade equation requires modification to reflect the current longissimus muscle area to hot carcass weight relationship." Journal of animal science. Jun. 1, 2008;86(6):1434-1438.

Lawrence, "Beef Yield Grading: History, Issues, and Opportunities" [Whitepaper] West Texas A&M University, Oct. 26, 2016, retrieved from the Internet: <URL: https://cabcattle.com/wp-content/uploads/CAB-Yield-Grade-Whitepaper-Final-26Oct2016.pdf> [retrieved on Oct. 16, 2023], 13 pages.

Moore et al., "National Beef Quality Audit—2011: In-plant survey of targeted carcass characteristics related to quality, quantity, value, and marketing of fed steers and heifers." Journal of Animal Science. Dec. 1, 2012;90(13):5143-5151.

Murphey et al., 1960. "Estimating yields of retail cuts from beef carcasses." Presented at the Sixty-second Meeting of the American Society of Animal Production. Chicago, Illinois—Nov. 26, 1960, 12 pages.

Pabiou et al., "Use of digital images to predict carcass cut yields in cattle." Livestock Science. May 1, 2011;137(1-3):130-140.

Priyanto et al., "Investigations into the accuracy of prediction of beef carcass composition using subcutaneous fat thickness and carcass weight I. Identifying problems." Meat science. Jun. 1, 1997;46(2):147-157.

Reis et al., "Early on-line classification of beef carcasses based on ultimate pH by near infrared spectroscopy." Meat Science. Feb. 1, 2014;96(2):862-869.

Ribeiro et al., "Using real-time ultrasound and carcass measurements to estimate total internal fat in beef cattle over different breed types and managements." Journal of Animal Science. Sep. 1, 2012;90(9):3259-3265.

Shackelford et al., "Field testing of a system for online classification of beef carcasses for longissimus tenderness using visible and near-infrared reflectance spectroscopy." Journal of animal science. Mar. 1, 2012;90(3):978-988.

USDA Economic Research Service Meat Statistics—data showing increased cattle carcass weights from 1950 to 2020, downloaded Sep. 26, 2023 from http://www.ers.usda.gov/data-products/livestock-meat-domestic-data.aspx#26070, 22 pages.

USDA, Annual Statistics Summary, Livestock, Poultry, and Grain Market News, "2016 Livestock, Meat, Poultry, Grain, and Slaughter Data" Agricultural Marketing Service, 2016, 139 pages, retrieved from the Internet: <URL: https://www.ams.usda.gov/sites/default/files/media/2016AnnualMeatTrade.pdf>.

Vote et al., "Video image analysis as a potential grading system for Uruguayan beef carcasses." Journal of animal science. Jul. 1, 2009;87(7):2376-2390.

Wyle et al., "Effectiveness of the SmartMV prototype BeefCam System to sort beef carcasses into expected palatability groups." Journal of Animal Science. Feb. 1, 2003;81(2):441-448.

Frontmatec, Handheld carcass grading system, Fat-O-Meat'er II TM, retrieved from the Internet: <URL: https://www.frontmatec.com/media/4231/frontmatec-instruments-fom-ii-web.pdf>, sales brochure, 8 pages [downloaded Apr. 14, 2025].

* cited by examiner

METHOD OF SORTING BEEF CARCASSES

CROSS-REFERENCE TO RELATED APPLICATIONS

This application is a national phase application of PCT Application No. PCT/US2021/058631, filed Nov. 9, 2021, which claims the benefit of U.S. Provisional Patent Application No. 63/111,260, filed Nov. 9, 2020, each of which is hereby incorporated by reference in its entirety.

FIELD

The present invention relates to a method of sorting beef carcasses.

BACKGROUND

Prediction of the yield of saleable products from beef carcasses has traditionally been accomplished using the Yield Grade equation. Yield Grade is a linear prediction of red meat yield (RMY) developed by the United States Department of Agriculture (USDA) in the late 1950's (Murphey et al., 1960). The prediction uses hot carcass weight (HCW), external (subcutaneous) fat thickness as measured opposite the Longissimus dorsi between the $12^{th}$ and $13^{th}$ rib (FT) (Image 1), area of the Longissimus dorsi muscle between the $12^{th}$ and $13^{th}$ rib (Ribeye Area, REA) (Image 1), and percent of HCW comprised of kidney, pelvic, and heart fat (KPH) to estimate yield of boneless, closely trimmed, subprimal cuts. Yield Grade is assigned as a numeric value of 1 to 5. Heavier muscled, leaner cattle that should yield a greater percentage of closely trimmed subprimal cuts relative to HCW, will have a lower numeric Yield Grade (1), whereas fatter, lighter muscled, lower yielding cattle will have a higher numeric Yield Grade (5). USDA Yield Grade equation listed below:

$$\text{USDA Yield Grade}=2.0+(2.5*\text{Fat Thickness})-(0.32*\text{REA})+(0.20*\text{KPH})+(0.0038*\text{HCW})$$

Calculation of Yield Grade begins by measuring FT. All carcasses have an initial Yield Grade of 2.0 and for each 0.1 in. of FT, an additional 0.25 is added to the numeric Yield Grade. The other fat metric, KPH, is set at a baseline of 3.5%. That is, for carcasses that have a HCW comprised of 3.5% KPH, no adjustment to Yield Grade is made. For each 0.5% below or above 3.5%, 0.1 is either subtracted or added from the numeric Yield Grade, respectively. The determination of muscling as it relates to overall composition is made using the REA of the carcass relative to the HCW. Carcasses with a HCW of 600 pounds require an 11.0 $in^2$ REA. For each additional 100 pounds of HCW, an additional 1.2 $in^2$ of REA are required. If a carcass is deficient in terms of the required REA, the numeric Yield Grade increases; whereas if the carcass has a larger REA than required, the numeric Yield Grade decreases.

Recent work has indicated the USDA Yield Grade equation does not accurately reflect the true growth of muscle (REA) relative to HCW (Lawrence et al., 2014). This may be more noticeable in populations of cattle not included in the development of the USDA Yield Grade equation. Specifically, Yield Grade may not be an accurate metric for fed steers produced from dairy breeds (Howard, 2013), animals fed growth promotants (Lawrence et al., 2014), and cattle that are substantially heavier than those harvested in the 1950's. Since 1950, the average HCW has increased from approximately 550 pounds to over 800 pounds, with up to 25% of commercial production weighing greater than 900 pounds (USDA-ERS, 2015; Moore et al., 2015.

Conventionally, processors use USDA Yield Grade to predict the yield of saleable items from the carcass. However, the Yield Grade equation is more effective at accounting for differences in the yield of whole muscle subprimal cuts than it is at estimating the yield of trimmings. Trimmings, or trim, are used to produce ground beef and are comprised of the pieces of lean and fat removed during the fabrication of whole-muscle cuts. The value of trim is determined based on the amount of lean relative to fat with leaner pieces commanding higher prices (USDA-AMS, 2016).

SUMMARY

Differences in the lean value of trim can influence total carcass value because up to 20% of the carcass ends up as trimmings Today, processors sort trim from certain anatomical locations of the carcass to provide trim products of various lean content ranges based on the prediction of expected lean point of trim obtained from that anatomical location. These trim products are listed, for example in the daily pricing report for National/Regional Daily Boneless Processing Beef and Beef Trimmings (USDA-AMS, 2016); some examples would include 90%, 81% and 50% lean trim. Trim having a higher lean content commands a higher price in the marketplace. Recent work has shown that trim from the same anatomical locations obtained from carcasses having comparable USDA Yield Grades may actually have very different lean values. This indicates that the Yield Grade equation is less capable in today's marketplace of estimating trim yield based on a primary value determinant.

The importance of trim is even more pronounced in populations of mature, non-fed cattle (cull cows) that are harvested almost exclusively for lean trimmings Unfortunately, the USDA Yield Grade equation is ineffective at estimating value differences in the lean content of carcasses from cull cows. Consequently, the ability of processors to effectively sort carcasses based on expected differences in lean value is limited to subjective methods. Metrics that are accurately able to reflect the lean value of trim would enhance the ability of processors to determine the value of carcasses from both fed (young steers and heifers) and non-fed (mature cows and bulls) cattle.

External (subcutaneous) fat is an important variable for consideration of subprimal yield; however, Boggs et al, 1998 showed that 30% of the total fat in a beef carcass is comprised of external fat, whereas 42% of fat in the carcass is comprised of intermuscular, or seam fat. The proportion of intermuscular fat to subcutaneous fat may be even more extreme in thin animals with very low body condition scores at time of harvest, such as cull cows or bulls. Additionally, fat present between the muscles must be removed during fabrication, particularly as the carcass is dissected to smaller pieces, a trend that is frequently occurring in the industry, today. A metric that can easily and accurately estimate seam fat could allow for enhanced prediction of subprimal yield and be influential in determining the lean value of trim.

Ribeye area as a predictor of subprimal yield has been shown to be ineffective for the type of carcasses that are being harvested in the beef industry (Lawrence et al, 2014). The principles of growth and development demonstrated by Berg and Butterfield, 1968 and 1976 would indicate that weight has a substantially larger impact on muscle size than do any perceived differences in the thickness or shape of any muscle. Differences in cross-sectional area of muscles like the Longissimus dorsi may be compensated for in additional skeletal length. That is, volume remains constant, although the dimensions (length, width, thickness) may change. No current metric utilized by the industry accounts for differences in length of muscles.

The ability of the beef industry to group cattle into uniform lots based on either expected cutability or quality is essential to creating value. Currently, the beef industry sorts carcasses after they are chilled and following grading by the USDA. Carcasses are sorted first based on USDA Quality Grade (designed to predict eating quality). Quality Grade (QG) is based on physiological maturity and the amount of marbling (intramuscular fat) in the ribeye. Additionally, carcasses are sorted based on weight (used to estimate portion size), and potentially based on cutability (Yield Grade). However, most facilities are limited to sorts on only two metrics (Quality Grade and weight) because of space and labor constraints. Conventional sortation also occurs only after the carcasses have been exposed to 24 to 48 hours of refrigeration. Uniformity may be limited because even the largest lots of cattle harvested consist of only a few hundred head. This means that cattle having entirely different breed composition or sex may be processed together. This random processing of cattle results in a wide range of carcass composition and quality in relative succession, which in turn randomizes the lean content of trim stream in the processing plant.

A conventional practice is to attempt to create high lean content trim products by mixing only high lean content trim with high lean content trim. Unfortunately, in conventional practice, the predictions for the lean value of trim occur in the processing plant only after carcasses have been sorted, fabricated and purchased by processors. This means that animals are processed without the benefit of accurate predictions of fat content in trim, and the trim stream from the processing of a plurality of animals has a wide variance of lean value of trim. This, in turn, leads to inadvertent mixture of low lean content trim with high lean content trim intended to prepare a high lean content trim product. Predictions that more accurately reflect the lean value of trim in real time in the plant prior to processing of the carcass would allow processors to more precisely sort and value carcasses based on expected lean value. This in turn would permit processors to group the carcasses having similar lean values for handling together.

Commercial beef processing facilities use up to fifteen coolers to chill cattle, which could allow for sortation of cattle based on composition. Leaner cattle require less chill time and could be grouped in larger lots than are normally present in the random process of harvest. This enables the producer to chill harvested animals for only that time necessary to achieve the temperature desired, allowing for optimization of energy use. Sorting to identify lean cattle requiring less chill time reduces unnecessary time of many carcasses spent in the coolers, utilizing available equipment more efficiently. Sorting carcasses into groups according to chill time allows some carcasses to be fabricated sooner than if they were grouped with carcasses requiring more chill time, potentially adding shelf-life to the raw materials that the plant produces. By reducing chill time, the amount of water that is lost from the muscle during chilling (shrink) is reduced. For example, a 0.1% reduction in shrink could represent over a million pounds of additional saleable product to the processor in a commercial scale production plant over a period of months.

In one aspect, a method of sorting beef carcasses comprises a) determining the hot carcass weight of a plurality of beef carcasses; b) measuring the Torso Section Thickness of the plurality of beef carcasses at a Standardized Location on the carcass torso, the Standardized Location having a subcutaneous fat thickness of less than about ½ inch; c) determining the ratio of hot carcass weight to Torso Section Thickness of individual carcasses of the plurality of beef carcasses; and d) prior to processing of the carcasses into smaller portions, sorting the carcasses into a first group if the ratio of hot carcass weight to Torso Section Thickness is less than a first predetermined value and into a second group if the ratio of hot carcass weight to Torso Section Thickness is greater than the first predetermined value.

In another aspect, a method of sorting beef carcasses comprises a) determining the hot carcass weight of a plurality of beef carcasses; b) measuring the Torso Section Thickness of the plurality of beef carcasses at a Standardized Location on the carcass torso of a portion of the carcass comprising the Cutaneous trunci muscle; c) determining the ratio of hot carcass weight to Torso Section Thickness of individual carcasses of the plurality of beef carcasses; and d) prior to processing of the carcasses into smaller portions, sorting the carcasses into a first group if the ratio of hot carcass weight to Torso Section Thickness is less than a first predetermined value and into a second group if the ratio of hot carcass weight to Torso Section Thickness is greater than the first predetermined value.

In another aspect, a method of sorting beef carcasses comprises a) measuring the lean point of the Torso Section of the plurality of beef carcasses at a Standardized Location on the carcass torso, the Standardized Location having a subcutaneous fat thickness of less than about ½ inch; and b) prior to processing of the carcasses into smaller portions, sorting the carcasses into a first sort group if the lean point is less than a first predetermined value and into a second sort group if the lean point is greater than the first predetermined value.

In another aspect, a method of sorting beef carcasses comprises a) measuring the lean point of the Torso Section of the plurality of beef carcasses at a Standardized Location on the carcass of a portion of the carcass comprising the Cutaneous trunci muscle; and b) prior to processing of the carcasses into smaller portions, sorting the carcasses into a first sort group if the lean point is less than a first predetermined value and into a second sort group if the lean point is greater than the first predetermined value.

BRIEF DESCRIPTION OF THE DRAWINGS

The accompanying drawings, which are incorporated in and constitute a part of this application, illustrate several aspects of the invention and together with a description of the embodiments serve to explain the principles of the invention. A brief description of the drawings is as follows.

DETAILED DESCRIPTION

The aspects of the present invention described below are not intended to be exhaustive or to limit the invention to the precise forms disclosed in the following detailed description. Rather a purpose of the aspects chosen and described is by way of illustration or example, so that the appreciation and understanding by others skilled in the art of the general principles and practices of the present invention can be facilitated.

For purposes of the present invention, the hot carcass weight is defined as the un-chilled weight of the carcass after slaughter and the removal of the head, hide, intestinal tract, and internal organs. The hot carcass weight preferably is determined on the production line. In an aspect, the hot carcass weight is determined when the carcass is suspended from a carcass conveyor system as part of a continuous or semi-continuous meat fabrication system, such as described in U.S. Pat. No. 8,002,613, the disclosure of which is incorporated herein by reference.

For purposes of the present invention, Torso Section Thickness is defined as the measurement of the shortest distance from the outer surface of the carcass to the abdominal cavity at a Standardized Location, the measurement being taken after the hide has been removed.

Figure 2:
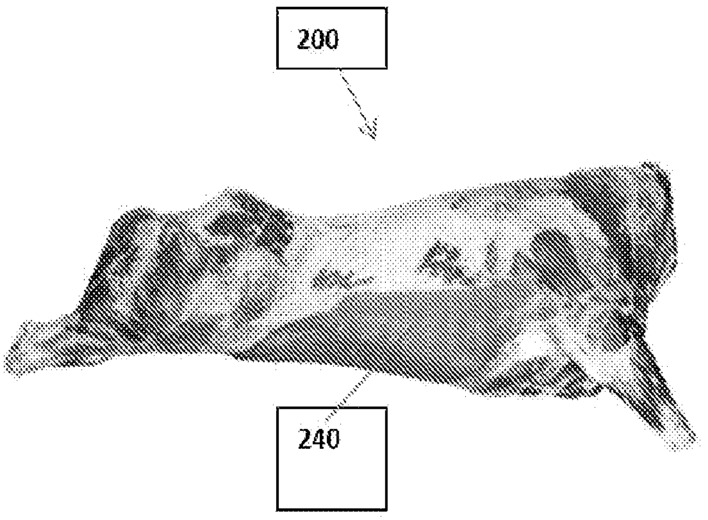
FIG. 2 is a photograph of a section view of a side of a carcass, showing lean and fat portions after hide removal.

In an aspect, the Torso Section Thickness measurement is taken at a Standardized Location on the carcass torso, the Standardized Location having a subcutaneous fat thickness of less than about ½ inch. The amount of subcutaneous fat present on the carcass may vary from one location to another on any given carcass. The location of measurement at a low subcutaneous fat thickness area provides a more accurate prediction of total fat present in the animal, including seam fat. It has been found that measurement of Torso Section Thickness provides a more accurate prediction of less easily measured non-subcutaneous fat when the thickness of subcutaneous fat is less than about ½ inch. In an aspect, the Standardized Location for measurement of the Torso Section Thickness is at a location wherein the thickness measurement is taken of a portion of the carcass comprising the Cutaneous trunci muscle. As shown in FIG. 2 is a photograph of a section view of a side of carcass 200, showing lean and fat portions after hide removal. Cutaneous trunci muscle 240 spans the lower portion of the carcass. It has been found that measurements taken at such locations within the region of the Cutaneous trunci muscle provide more accurate predictions of less easily measured non-subcutaneous fat.

Measurements must be taken at a Standardized Location on the carcass torso to provide a reproducible comparison of the Torso Section Thickness of a plurality of beef carcasses. For example, it would not be appropriate to measure Torso Section Thickness measurements taken on some carcasses at a location that is between the $12^{th}$ and $13^{th}$ rib at a point half of the distance from the spine to the sternum in some animals with measurements taken at a location that is between the $5^{th}$ and $6^{th}$ rib at the sternum in others.

Figure 1:
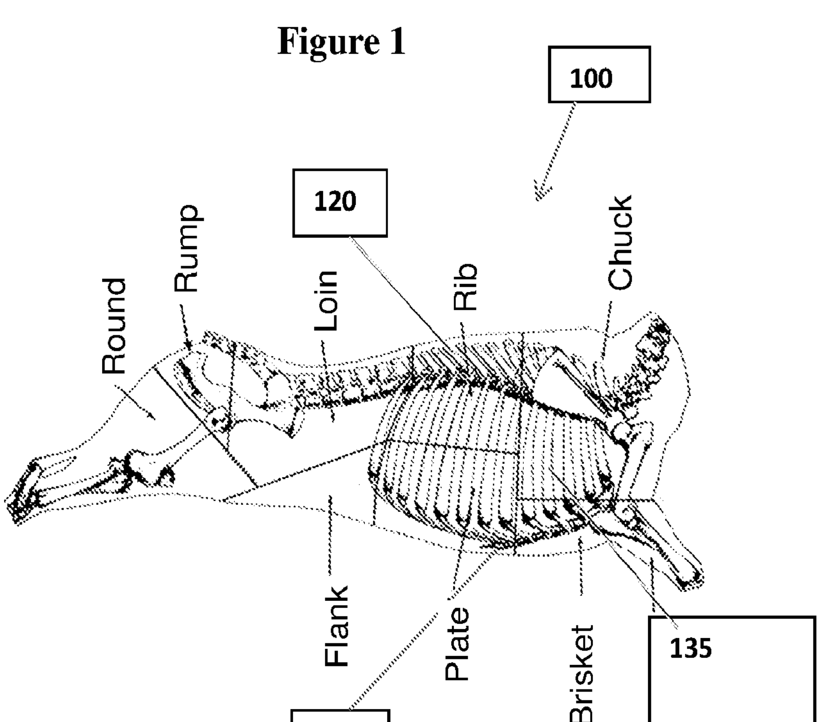
FIG. 1 is a section view of a side of a carcass, showing anatomical features.

For purposes of the present invention, a Standardized Location is a defined area on the carcass for taking measurements that can be reproducible identified on a plurality of carcasses by the skilled plant working for obtaining reproducible and comparable data. FIG. 1 is a section view of a side of carcass 100, showing anatomical features. Spine 120, sternum 130 and ribs 135 serve as easily identifiable reference locations for identification of Standardized Locations by the skilled plant worker. In an aspect, the Standardized Location is a defined area of about 25 square inches in size. In an aspect, the Standardized Location is a defined area of about 9 square inches in size. The measurement, whether it be the Torso Section Thickness or the lean point, is taken within this defined area.

In an aspect, the Standardized Location for measurement of the Torso Section Thickness is at a location a) between i) a point half of the distance from the spine to the sternum (i.e. the coronal plane) and ii) the sternum; and b) between the $5^{th}$ and $13^{th}$ rib. As will be recognized in view of the discussion above, this does not mean that measurements of can be taken anywhere at random within this wide defined area of the carcass. Rather, this defined area is the region of the carcass that generally meet the criteria of providing an accurate prediction of total fat present in the animal, including seam fat. Within this defined area, one must still select the Standardized Location that is a smaller identifiable location for obtaining reproducible and comparable data.

In an aspect, the Standardized Location for measurement of the Torso Section Thickness is at a location a) between i) a point two-thirds of the distance from the spine to the sternum and ii) a point four-fifths of the distance from the spine to the sternum; and b) between the $5^{th}$ and $13^{th}$ rib. In an aspect, the Standardized Location for measurement of the Torso Section Thickness is at a location a) between i) a point half of the distance from the spine to the sternum and ii) the sternum; and b) between the $5^{th}$ and $8^{th}$ rib. In an aspect, the Standardized Location for measurement of the Torso Section Thickness is at a location a) between i) a point two-thirds of the distance from the spine to the sternum and ii) a point four-fifths of the distance from the spine to the sternum; and b) between the $5^{th}$ and $8^{th}$ rib. In an aspect, the Standardized Location for measurement of the Torso Section Thickness is at a location a) between i) a point half of the distance from the spine to the sternum and ii) the sternum; and b) between the $7^{th}$ and $8^{th}$ rib. In an aspect, the Standardized Location for measurement of the Torso Section Thickness is at a location a) between i) a point two-thirds of the distance from the spine to the sternum and ii) a point four-fifths of the distance from the spine to the sternum; and b) between the $7^{th}$ and $8^{th}$ rib.

Torso Section Thickness may be evaluated in any appropriate technique, such as simply measuring using a ruler, a Fat-O-Meatz'er™ probe (commercially available from Carometec A/S, Denmark), or by ultrasound.

After having determined the hot carcass weight and Torso Section Thickness, the ratio of hot carcass weight to Torso Section Thickness is determined. This ratio is correlated with the carcass for use in sorting.

For purposes of the present invention, the "lean point" is defined as the percentage of lean (as distinguished from fat) as determined from a boneless sample from a Standardized Location on the carcass torso. Lean point is measured by evaluating the percentage of lean of the sample of the carcass from the outer surface of the carcass (after the hide has been removed) to the abdominal cavity. Just as discussed above in the context of measuring Torso Section Thickness, measurements of lean point must be taken at a Standardized Location on the carcass torso to provide a reproducible comparison of the lean point of a plurality of beef carcasses. All definitions and discussion relative to measuring Torso Section Thickness therefore apply to identification of location of measurements of lean point.

Lean point may be determined by any appropriate technique providing timely analysis for correlating the lean point information with the carcass in time for use in sorting of the carcass. In an aspect, the lean point of the Torso Section is determined by x-ray technology, whereby an x-ray sensor is configured to take a measurement of the lean point of the Torso Section of the plurality of beef carcasses at a Standardized Location on the carcass torso on the processing line. In an aspect, the lean point of the Torso Section is determined by quick assay, such as procuring a sample from the Standardized Location and conducting a rapid analysis, e.g. by chemical or spectrophotometric methods.

In an aspect, the determination of the hot carcass weight, the Torso Section Thickness of the plurality of beef carcasses, and/or the lean point of the Torso Section of the plurality of beef carcasses is made after harvesting and after removal of the head, hide, intestinal tract, and internal organs, but prior to further subdivision of the carcass. In an aspect, the determination of the hot carcass weight, the Torso Section Thickness of the plurality of beef carcasses, and/or the lean point of the Torso Section of the plurality of beef carcasses is made after the carcass is split, i.e., after separation of the carcasses in two as conventionally carried out in the beef processing industry.

In an aspect, prior to processing of the carcasses into smaller portions, the carcasses are sorted into a first group if the ratio of hot carcass weight to Torso Section Thickness is less than a first predetermined value and into a second group if the ratio of hot carcass weight to Torso Section Thickness is greater than the first predetermined value. In an aspect, the first predetermined value is a value selected from about 0.003 cm/lbs to about 0.007 cm/lbs. In an aspect, the first predetermined value is a value selected from about 0.004 cm/lbs to about 0.006 cm/lbs.

In an aspect, prior to processing of the carcasses into smaller portions, sorting the carcasses into a first sort group if the ratio of hot carcass weight to Torso Section Thickness is less than a first predetermined value, into a second sort group if the ratio of hot carcass weight to Torso Section Thickness is from the first predetermined value and a second predetermined value, and into a third sort group if the ratio of hot carcass weight to Torso Section Thickness is greater than the second predetermined value. In an aspect, the first predetermined value is a value selected from about 0.002 cm/lbs to about 0.006 cm/lbs. and the second predetermined value of the ratio of hot carcass weight to Torso Section Thickness is a value selected from about 0.008 cm/lbs to about 0.01 cm/lbs.

Similarly, in an aspect prior to processing of the carcasses into smaller portions, the carcasses are sorted into a first group if the lean point is less than a first predetermined value and into a second group if the lean point is greater than the first predetermined value. In an aspect, the first predetermined value is a value selected the first predetermined value of lean point is a value selected from about 50 to about 62 percent lean. In an aspect, the first predetermined value is a value selected from about 55 to about 60 percent lean.

Likewise, in an aspect wherein prior to processing of the carcasses into smaller portions, sorting the carcasses into a first sort group if the lean point is less than a first predetermined value, into a second sort group if the lean point is from the first predetermined value and a second predetermined value, and into a third sort group if the lean point is greater than the second predetermined value. In an aspect, the first predetermined value of the lean point is a value selected from about 45 to about 55 and the second predetermined value of the lean point is a value selected from about 58 to about 62.

In an aspect, after the sorting of the carcasses, the carcasses from the first sort group are chilled in one or more chilling areas that are separate from the chilling areas of the second sort group. In an aspect, after the sorting of the carcasses, the carcasses from the first sort group are chilled for a chill time that is different from the chill time of the second sort group.

In an aspect, after the sorting of the carcasses, the carcasses of the first sort group are processed into smaller portions and trim separately from the carcasses of the second sort group.

In an aspect, after the sorting of the carcasses, the carcasses of the first sort group are processed into smaller portions and trim separately from the carcasses of the second sort group, such that the trim stream from the first sort group has a fat content of less than about 75%, and the trim stream from the second sort group has a fat content greater or equal to about 75%.

In an aspect, after the sorting of the carcasses, the carcasses from the first sort group, the second sort group and the third sort group are chilled in one or more chilling areas that are separate from the chilling areas of each of the other sort groups.

In an aspect, after the sorting of the carcasses, the carcasses from the first sort group, the second sort group and the third sort group are chilled for a chill time that is different from the chill time of each of the other sort groups.

In an aspect, after the sorting of the carcasses, the carcasses from the first sort group, the second sort group and the third sort group are processed into smaller portions and trim separately from the carcasses of each of the other sort groups.

In an aspect, after the sorting of the carcasses, the carcasses from the first sort group, the second sort group and the third sort group are processed into smaller portions and trim separately from the carcasses of each of the other sort groups, such that the trim stream from the first sort group has a lean content of less than about 65%, the trim stream from the second sort group has a lean content greater than or equal to about 65%, and the trim stream from the third sort group has a lean content greater than about 75%.

In an aspect, any of the recited steps, or in another aspect all of the recited steps of the present method are performed at speeds that equal the chain speed of the processing line, referred to herein as "commercial chain speeds." For example, in commercial beef production, carcasses may move along a single chain or line at the rate of 150-600 head of cattle per hour, more particularly 200-400 head of cattle per hour, and even more particularly 250-350 head of cattle per hour.

As used herein, the terms "about" or "approximately" mean within an acceptable range for the particular parameter specified as determined by one of ordinary skill in the art, which will depend in part on how the value is measured or determined, e.g., the limitations of the sample preparation and measurement system. Examples of such limitations include preparing the sample in a wet versus a dry environment, different instruments, variations in sample height, and differing requirements in signal-to-noise ratios. For example, "about" can mean greater or lesser than the value or range of values stated by 1/10 of the stated values, but is not intended to limit any value or range of values to only this broader definition. For instance, a concentration value of about 30% means a concentration between 27% and 33%. Each value or range of values preceded by the term "about" is also intended to encompass the embodiment of the stated absolute value or range of values. Alternatively, particularly with respect to biological systems or processes, the term can mean within an order of magnitude, preferably within 5-fold, and more preferably within 2-fold, of a value.

Throughout this specification and claims, unless the context requires otherwise, the word "comprise", and variations such as "comprises" and "comprising", will be understood to imply the inclusion of a stated integer or step or group of integers or steps but not the exclusion of any other integer or step or group of integer or step. When used herein "consisting of" excludes any element, step, or ingredient not specified in the claim element. When used herein, "consisting essentially of" does not exclude materials or steps that do not materially affect the basic and novel characteristics of the claim. In the present disclosure of various embodiments, any of the terms "comprising", "consisting essentially of" and "consisting of" used in the description of an embodiment may be replaced with either of the other two terms.

All patents, patent applications (including provisional applications), and publications cited herein are incorporated by reference as if individually incorporated for all purposes. Unless otherwise indicated, all parts and percentages are by weight and all molecular weights are weight average molecular weights. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. A method of sorting beef carcasses comprising:

a) determining the hot carcass weight of a plurality of beef carcasses; and b) measuring a Torso Section Thickness of the plurality of beef carcasses at a Standardized Location on the carcass torso, the Torso Section Thickness being defined as a measurement of a distance from an outer surface of the beef carcasses to an abdominal cavity at the Standardized Location, and the Standardized Location being at a location between a first portion at (i) a point half of a distance from a spine to a sternum and (ii) the sternum and a second portion between a $5^{th}$ and a $13^{th}$ rib and having a subcutaneous fat thickness of less than about ½ inch; and c) determining a ratio of hot carcass weight to Torso Section Thickness of individual carcasses of the plurality of beef carcasses; and d) sorting the carcasses into a first sort group if the ratio of hot carcass weight to Torso Section Thickness is less than a first predetermined value and into a second sort group if the ratio of hot carcass weight to Torso Section Thickness is equal to or greater than the first predetermined value; and, thereafter, e) processing the carcasses of the first sort group into smaller portions separately from the carcasses of the second sort group.

2. The method of claim 1, wherein the Standardized Location is within a defined area of about 25 square inches in size.

3. The method of claim 1, wherein the first predetermined value of the ratio of hot carcass weight to Torso Section Thickness is a value selected from about 0.003 cm/lbs to about 0.007 cm/lbs.

4. The method of claim 1, wherein sorting the carcasses further comprises sorting the carcasses into a third sort group, wherein the carcasses are sorted into the second sort group if the ratio of hot carcass weight to Torso Section Thickness is greater than or equal to the first predetermined value and less than or equal to a second predetermined value, and into the third sort group if the ratio of hot carcass weight to Torso Section Thickness is greater than the second predetermined value.

5. The method of claim 4, wherein the first predetermined value of the ratio of hot carcass weight to Torso Section Thickness is a value selected from about 0.002 cm/lbs to about 0.006 cm/lbs, and the second predetermined value of the ratio of hot carcass weight to Torso Section Thickness is a value selected from about 0.008 cm/lbs to about 0.01 cm/lbs.

6. The method of claim 1, wherein the carcasses of the first sort group are processed into the smaller portions and trim separately from the carcasses of the second sort group, such that a trim stream from the first sort group has a fat content of less than about 75%, and a trim stream from the second sort group has a fat content greater or equal to about 75%.

7. The method of claim 4, wherein after the sorting of the carcasses, the carcasses from the first sort group, the second sort group and the third sort group are processed into the smaller portions and trim separately from the carcasses of each of the other sort groups.

8. The method of claim 4, wherein after the sorting of the carcasses, the carcasses from the first sort group, the second sort group and the third sort group are processed into the smaller portions and trim separately from the carcasses of each of the other sort groups, such that a trim stream from the first sort group has a lean content of less than about 65%, a trim stream from the second sort group has a lean content greater than or equal to about 65% and less than or equal to about 75%, and a trim stream from the third sort group has a lean content greater than about 75%.

9. A method of sorting beef carcasses comprising:

a) determining the hot carcass weight of a plurality of beef carcasses; and b) measuring a Torso Section Thickness of the plurality of beef carcasses at a Standardized Location on the carcass torso, the Torso Section Thickness being defined as a measurement of a distance from an outer surface of the beef carcasses to an abdominal cavity at the Standardized Location, and the Standard Location being at a location comprising the Cutaneous trunci muscle between a first portion at (i) a point two-thirds of a distance from a spine to a sternum and (ii) a point four-fifths of a distance from the spine to the sternum, and a second portion between a $5^{th}$ rib and a $13^{th}$ rib; and c) determining a ratio of hot carcass weight to Torso Section Thickness of individual carcasses of the plurality of beef carcasses; and d) sorting the carcasses into a first sort group if the ratio of hot carcass weight to Torso Section Thickness is less than a first predetermined value and into a second sort group if the ratio of hot carcass weight to Torso Section Thickness is equal to or greater than the first predetermined value; and, thereafter, e) processing the carcasses of the first sort group into smaller portions separately from the carcasses of the second sort group.

10. The method of claim 9, wherein sorting the carcasses further comprises sorting the carcasses into a third sort group, wherein the carcasses are sorted into the second sort group if the ratio of hot carcass weight to Torso Section Thickness is greater than or equal to the first predetermined value and less than or equal to a second predetermined value, and into the third sort group if the ratio of hot carcass weight to Torso Section Thickness is greater than the second predetermined value.

11. A method of sorting beef carcasses comprising:

a) determining the hot carcass weight of a plurality of beef carcasses; and b) measuring a Torso Section Thickness of the plurality of beef carcasses at a Standardized Location on the carcass torso, the Torso Section Thickness being defined as a measurement of a distance from an outer surface of the beef carcasses to an abdominal cavity at the Standardized Location, and the Standardized Location being at a location between a first portion at (i) a point half of a distance from a spine to a sternum and (ii) the sternum and a second portion between a $5^{th}$ and a $13^{th}$ rib and having a subcutaneous fat thickness of less than about ½ inch; and c) determining a ratio of hot carcass weight to Torso Section Thickness of individual carcasses of the plurality of beef carcasses; and d) sorting the carcasses into a first sort group if the ratio of hot carcass weight to Torso Section Thickness is less than a first predetermined value and into a second sort group if the ratio of hot carcass weight to Torso Section Thickness is equal to or greater than the first predetermined value; and, thereafter, e) chilling the carcasses of the first sort group in one or more chilling areas that are separate from one or more chilling areas of the second sort group.

12. The method of claim 11, wherein the carcasses from the first sort group are chilled for a chill time that is different from a chill time of the second sort group.

13. The method of claim 11, wherein sorting the carcasses further comprises sorting the carcasses into a third sort group, wherein the carcasses are sorted into the second sort group if the ratio of hot carcass weight to Torso Section Thickness is greater than or equal to the first predetermined value and less than or equal to a second predetermined value, and into the third sort group if the ratio of hot carcass weight to Torso Section Thickness is greater than the second predetermined value, wherein after the sorting of the carcasses, the carcasses from the first sort group, the second sort group and the third sort group are chilled in one or more chilling areas that are separate from one or more chilling areas of each of the other sort groups.

14. The method of claim 13, wherein after the sorting of the carcasses, the carcasses from the first sort group, the second sort group and the third sort group are chilled for a chill time that is different from a chill time of each of the other sort groups.

15. A method of sorting beef carcasses comprising:

a) determining the hot carcass weight of a plurality of beef carcasses; and b) measuring a Torso Section Thickness of the plurality of beef carcasses at a Standardized Location on the carcass torso, the Torso Section Thickness being defined as a measurement of a distance from an outer surface of the beef carcasses to an abdominal cavity at the Standardized Location, and the Standard Location being at a location comprising the Cutaneous trunci muscle between a first portion at (i) a point two-thirds of a distance from a spine to a sternum and (ii) a point four-fifths of a distance from the spine to the sternum, and a second portion between a $5^{th}$ rib and a $13^{th}$ rib; and c) determining a ratio of hot carcass weight to Torso Section Thickness of individual carcasses of the plurality of beef carcasses; and d) sorting the carcasses into a first sort group if the ratio of hot carcass weight to Torso Section Thickness is less than a first predetermined value and into a second sort group if the ratio of hot carcass weight to Torso Section Thickness is equal to or greater than the first predetermined value; and, thereafter, e) chilling the carcasses of the first sort group in one or more chilling areas that are separate from one or more chilling areas of the second sort group.

16. The method of claim 15, wherein the carcasses from the first sort group are chilled for a chill time that is different from a chill time of the second sort group.

17. The method of claim 15, wherein sorting the carcasses further comprises sorting the carcasses into a third sort group, wherein the carcasses are sorted into the second sort group if the ratio of hot carcass weight to Torso Section Thickness is greater than or equal to the first predetermined value and less than or equal to a second predetermined value, and into the third sort group if the ratio of hot carcass weight to Torso Section Thickness is greater than the second predetermined value, wherein after the sorting of the carcasses, the carcasses from the first sort group, the second sort group and the third sort group are chilled in one or more chilling areas that are separate from one or more chilling areas of each of the other sort groups.

18. The method of claim 17, wherein after the sorting of the carcasses, the carcasses from the first sort group, the second sort group and the third sort group are chilled for a chill time that is different from a chill time of each of the other sort groups.

* * * * *